US012772095B2

(12) United States Patent
Ramachandran et al.

(10) Patent No.: US 12,772,095 B2
(45) Date of Patent: Oct. 20, 2026

(54) ADAPTIVE PERFORMANCE MONITORING

(71) Applicant: Nokia Technologies Oy, Espoo (FI)

(72) Inventors: Srilatha Ramachandran, Bengaluru (IN); Shivanand Kadadi, Bengaluru (IN); Afef Feki, Sceaux (FR); Anna Pantelidou, Antony (FR)

(73) Assignee: Nokia Technologies Oy, Espoo (FI)

( * ) Notice: Subject to any disclaimer, the term of this patent is extended or adjusted under 35 U.S.C. 154(b) by 260 days.

(21) Appl. No.: 18/787,591

(22) Filed: Jul. 29, 2024

(65) Prior Publication Data

US 2025/0048160 A1 Feb. 6, 2025

(30) Foreign Application Priority Data

Aug. 2, 2023 (FI) ..................................... 20235859

(51) Int. Cl.
*H04W 24/10* (2009.01)
*H04W 24/04* (2009.01)

(52) U.S. Cl.
CPC ........... *H04W 24/10* (2013.01); *H04W 24/04* (2013.01)

(58) Field of Classification Search
CPC ..... H04W 24/10; H04W 24/04; H04W 24/08; H04L 43/02; H04L 43/08
See application file for complete search history.

(56) References Cited

U.S. PATENT DOCUMENTS

2020/0008084 A1* 1/2020 Das ..................... H04L 41/0823
2020/0313985 A1* 10/2020 Jayakumar .......... H04L 41/0896
2022/0237069 A1* 7/2022 Freeman ............... G06F 11/076
2022/0255799 A1* 8/2022 Singla ................. H04L 41/0803
2023/0066770 A1* 3/2023 Martinovych ... G06Q 10/06375
2023/0087821 A1* 3/2023 Xu ........................ G06F 18/295 706/12
2023/0142028 A1* 5/2023 Cheng ..................... H04L 43/16 709/224
2024/0161000 A1* 5/2024 Zasman ................ G06N 10/00
2024/0428077 A1* 12/2024 Jiang ...................... G06N 3/045
2026/0140809 A1* 5/2026 Vanhoudt .............. G06F 11/079

FOREIGN PATENT DOCUMENTS

CN 108122326 A * 6/2018 ............ G07D 11/20
WO 2021155090 A1 8/2021
WO 2021201728 A1 10/2021

(Continued)

OTHER PUBLICATIONS

Office Action, dated Dec. 21, 2023, by the Finish Patent and Registration Office, in FI Application No. 20235859, 17 pages.

(Continued)

*Primary Examiner* — Liem H. Nguyen
(74) *Attorney, Agent, or Firm* — Barta Jones, PLLC

(57) ABSTRACT

Solutions for adaptive performance monitoring are disclosed. A solution comprises maintaining (200) ability to collect network performance data utilising a collecting policy from more than one collecting policy, receiving (202) from a network element a request to apply a given collecting policy, applying (204) the requested collecting policy in collecting network performance data and transmitting (206) network performance data to network based on the applied policy.

20 Claims, 7 Drawing Sheets

(56) References Cited

FOREIGN PATENT DOCUMENTS

WO WO-2024021571 A1 * 2/2024 ............ H04W 52/02

OTHER PUBLICATIONS

Search Report, dated Dec. 21, 2023, by the Finish Patent and Registration Office, in FI Application No. 20235859, 2 pages.

Sharp, R2-2305826, Discussion on Model Monitoring and Reporting Considering Functionality and Model ID based LCM. 3GPP TSG RAN WG2, Meeting #121, Incheon, Korea, May 22-May 26, 2023, Agenda Item: 7.16.2.4: [online], May 11, 2023, [retrieved on Dec. 20, 2023]. Retrieved from <https://www.3gpp.org/ftp/tsg_ran/WG2_RL2/TSGR2_122/Docs/R2-2305826.zip>, 9 pages.

3GPP TS 23.288 V18.2.0 (Jun. 2023), Architecture enhancements for 5G System (5GS) to support network data analytics services (Release 18). [online], Jun. 21, 2023, [retrieved on Dec. 20, 2023]. Retrieved from <https://ftp.3gpp.org/Specs/archive/23_series/23.288/23288-i20.zip>, 315 pages.

* cited by examiner

ADAPTIVE PERFORMANCE MONITORING

TECHNICAL FIELD

The exemplary and non-limiting embodiments of the invention relate generally to wireless communication systems. Embodiments of the invention relate especially to apparatuses and methods in wireless communication networks.

BACKGROUND

Modern wireless communication systems are complex systems. The communication systems and networks are widely used and securing the operation of the systems and monitoring that the offered service is of acceptable quality is an important part of the maintenance of the networks.

Typically, the performance of the networks is monitored by gathering data related to the operation if the networks. Important performance parameters may be called Key Performance Indicators, KPIs. If networks may operate in varying conditions utilizing several operation algorithms, collecting KPIs in a reliable manner is important.

BRIEF DESCRIPTION

According to an aspect, there is provided the subject matter of the independent claims. Embodiments are defined in the dependent claims.

One or more examples of implementations are set forth in more detail in the accompanying drawings and the description below. Other features will be apparent from the description, drawings and the claims.

BRIEF DESCRIPTION OF DRAWINGS

In the following, embodiments will be described in greater detail with reference to the attached drawings, in which.

DETAILED DESCRIPTION OF SOME EMBODIMENTS

The following embodiments are only presented as examples. Although the specification may refer to "an", "one", or "some" embodiment(s) and/or example(s) in several locations of the text, this does not necessarily mean that each reference is made to the same embodiment(s) or example(s), or that a particular feature only applies to a single embodiment and/or example. Single features of different embodiments and/or examples may also be combined to provide other embodiments and/or examples.

In the following, different exemplifying embodiments will be described using, as an example of an access architecture to which the embodiments may be applied, a radio access architecture based on long term evolution advanced (LTE Advanced, LTE-A) or new radio (NR, 5G), without restricting the embodiments to such an architecture, however. It is obvious for a person skilled in the art that the embodiments may also be applied to other kinds of communications networks having suitable means by adjusting parameters and procedures appropriately. Some examples of other options for suitable systems are the universal mobile telecommunications system (UMTS) radio access network (UTRAN or E-UTRAN), long term evolution (LTE, the same as E-UTRA), wireless local area network (WLAN or WiFi), worldwide interoperability for microwave access (WiMAX), Bluetooth®, personal communications services (PCS), ZigBee®, wideband code division multiple access (WCDMA), systems using ultra-wideband (UWB) technology, sensor networks, mobile ad-hoc networks (MANETs) and Internet Protocol multimedia subsystems (IMS) or any combination thereof.

Figure 1:
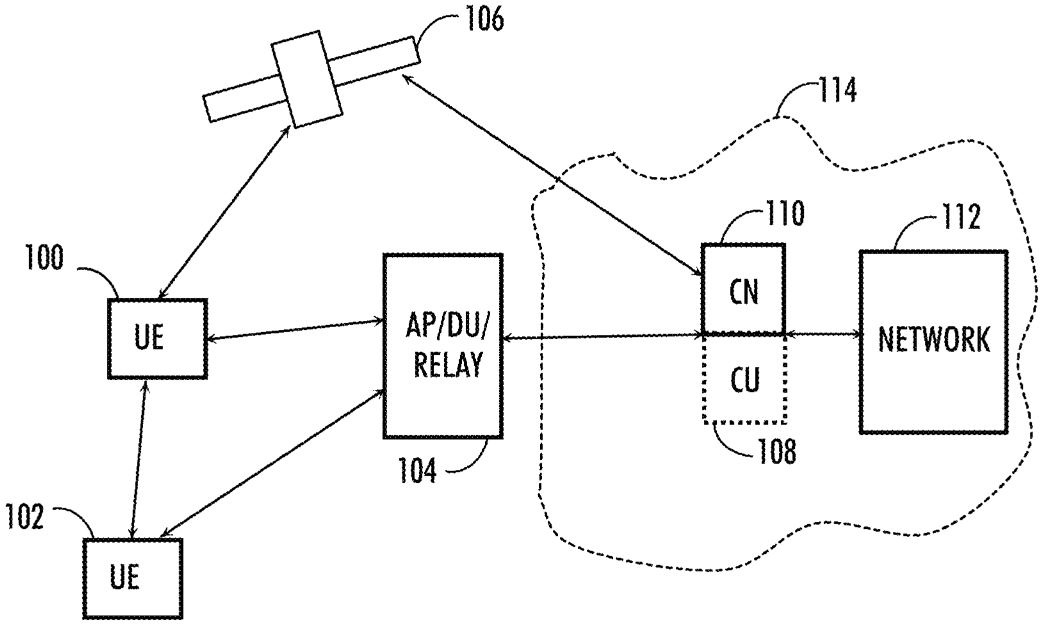
FIG. 1 illustrates an exemplified wireless communication system.

FIG. 1 depicts examples of simplified system architectures only showing some elements and functional entities, all being logical units, whose implementation may differ from what is shown. The connections shown in FIG. 1 are logical connections; the actual physical connections may be different. It is apparent to a person skilled in the art that the system typically comprises also other functions and structures than those shown in FIG. 1.

The embodiments are not, however, restricted to the system given as an example but a person skilled in the art may apply the solution to other communication systems provided with necessary properties.

The example of FIG. 1 shows a part of an exemplifying radio access network.

FIG. 1 shows user devices 100 and 102 configured to be in a wireless connection on one or more communication channels in a cell with an access node (such as (e/g)NodeB) 104 providing the cell. The physical link from a user device to a (e/g)NodeB is called uplink or reverse link and the physical link from the (e/g)NodeB to the user device is called downlink or forward link. It should be appreciated that (e/g)NodeBs or their functionalities may be implemented by using any node, host, server or access point etc. entity suitable for such a usage.

A communications system typically comprises more than one (e/g)NodeB in which case the (e/g)NodeBs may also be configured to communicate with one another over links, wired or wireless, designed for the purpose. These links may be used for signalling purposes. The (e/g)NodeB is a computing device configured to control the radio resources of communication system it is coupled to. The NodeB may also be referred to as a base station, an access point or any other type of interfacing device including a relay station capable of operating in a wireless environment. The (e/g)NodeB includes or is coupled to transceivers. From the transceivers of the (e/g)NodeB, a connection is provided to an antenna unit that establishes bi-directional radio links to user devices. The antenna unit may comprise a plurality of antennas or antenna elements. The (e/g)NodeB is further connected to core network 110 (CN or next generation core NGC). Depending on the system, the counterpart on the CN side can be a serving gateway (S-GW, routing and forwarding user data packets), packet data network gateway (P-GW), for providing connectivity of user devices (UEs) to external packet data networks, or mobile management entity (MME), etc.

The user device (also called UE, user equipment, user terminal, terminal device, etc.) illustrates one type of an apparatus to which resources on the air interface are allocated and assigned, and thus any feature described herein with a user device may be implemented with a corresponding apparatus, such as a relay node. An example of such a relay node is a layer 3 relay (self-backhauling relay) towards the base station.

The user device typically refers to a portable computing device that includes wireless mobile communication devices operating with or without a subscriber identification module (SIM), including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, and multimedia device. It should be appreciated that a user device may also be a nearly exclusive uplink only device, of which an example is a camera or video camera loading images or video clips to a network. A user device may also be a device having capability to operate in Internet of Things (IoT) network which is a scenario in which objects are provided with the ability to transfer data over a network without requiring human-to-human or human-to-computer interaction. The user device (or in some embodiments a layer 3 relay node) is configured to perform one or more of user equipment functionalities. The user device may also be called a subscriber unit, mobile station, remote terminal, access terminal, user terminal or user equipment (UE) just to mention but a few names or apparatuses.

Various techniques described herein may also be applied to a cyber-physical system (CPS) (a system of collaborating computational elements controlling physical entities). CPS may enable the implementation and exploitation of massive amounts of interconnected ICT devices (sensors, actuators, processors microcontrollers, etc.) embedded in physical objects at different locations. Mobile cyber physical systems, in which the physical system in question has inherent mobility, are a subcategory of cyber-physical systems. Examples of mobile physical systems include mobile robotics and electronics transported by humans or animals.

It should be understood that, in FIG. 1, user devices are depicted to include 2 antennas only for the sake of clarity. The number of reception and/or transmission antennas may naturally vary according to a current implementation.

Additionally, although the apparatuses have been depicted as single entities, different units, processors and/or memory units (not all shown in FIG. 1) may be implemented.

5G enables using multiple input-multiple output (MIMO) antennas, many more base stations or nodes than the LTE (a so-called small cell concept), including macro sites operating in co-operation with smaller stations and employing a variety of radio technologies depending on service needs, use cases and/or spectrum available. 5G mobile communications supports a wide range of use cases and related applications including video streaming, augmented reality, different ways of data sharing and various forms of machine type applications, including vehicular safety, different sensors and real-time control. 5G is expected to have multiple radio interfaces, namely below 6 GHz, cmWave and mmWave, and also being integradable with existing legacy radio access technologies, such as the LTE. Integration with the LTE may be implemented, at least in the early phase, as a system, where macro coverage is provided by the LTE and 5G radio interface access comes from small cells by aggregation to the LTE. In other words, 5G is planned to support both inter-RAT operability (such as LTE-5G) and inter-RI operability (inter-radio interface operability, such as below 6 GHz-cmWave, below 6 GHz-cmWave-mmWave). One of the concepts considered to be used in 5G networks is network slicing in which multiple independent and dedicated virtual sub-networks (network instances) may be created within the same infrastructure to run services that have different requirements on latency, reliability, throughput and mobility.

The current architecture in LTE networks is fully distributed in the radio and fully centralized in the core network. The low latency applications and services in 5G require to bring the content close to the radio which leads to local break out and multi-access edge computing (MEC). 5G enables analytics and knowledge generation to occur at the source of the data. This approach requires leveraging resources that may not be continuously connected to a network such as laptops, smartphones, tablets and sensors. MEC provides a distributed computing environment for application and service hosting. It also has the ability to store and process content in close proximity to cellular subscribers for faster response time. Edge computing covers a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications).

The communication system is also able to communicate with other networks, such as a public switched telephone network or the Internet 112, or utilise services provided by them. The communication network may also be able to support the usage of cloud services, for example at least part of core network operations may be carried out as a cloud service (this is depicted in FIG. 1 by "cloud" 114). The communication system may also comprise a central control entity, or a like, providing facilities for networks of different operators to cooperate for example in spectrum sharing.

Edge cloud may be brought into radio access network (RAN) by utilizing network function virtualization (NVF) and software defined networking (SDN). Using edge cloud may mean access node operations to be carried out, at least partly, in a server, host or node operationally coupled to a remote radio head or base station comprising radio parts. It is also possible that node operations will be distributed among a plurality of servers, nodes or hosts. Application of cloudRAN architecture enables RAN real time functions being carried out at the RAN side (in a distributed unit, DU 104) and non-real time functions being carried out in a centralized manner (in a centralized unit, CU 108).

It should also be understood that the distribution of labour between core network operations and base station operations may differ from that of the LTE or even be non-existent. Some other technology advancements probably to be used are Big Data and all-IP, which may change the way networks are being constructed and managed. 5G (or new radio, NR) networks are being designed to support multiple hierarchies, where MEC servers can be placed between the core and the base station or nodeB (gNB). It should be appreciated that MEC can be applied in 4G networks as well.

5G may also utilize satellite communication to enhance or complement the coverage of 5G service, for example by providing backhauling. Possible use cases are providing service continuity for machine-to-machine (M2M) or Internet of Things (IoT) devices or for passengers on board of vehicles, or ensuring service availability for critical communications, and future railway/maritime/aeronautical communications. Satellite communication may utilise geostationary earth orbit (GEO) satellite systems, but also low earth orbit (LEO) satellite systems, in particular mega-constellations (systems in which hundreds of (nano)satellites are deployed). Each satellite 106 in the mega-constellation may cover several satellite-enabled network entities that create on-ground cells. The on-ground cells may be created through an on-ground relay node 104 or by a gNB located on-ground or in a satellite.

It is obvious for a person skilled in the art that the depicted system is only an example of a part of a radio access system and in practice, the system may comprise a plurality of (e/g)NodeBs, the user device may have an access to a plurality of radio cells and the system may comprise also other apparatuses, such as physical layer relay nodes or other network elements, etc. At least one of the (e/g)NodeBs or may be a Home(e/g)nodeB. Additionally, in a geographical area of a radio communication system a plurality of different kinds of radio cells as well as a plurality of radio cells may be provided. Radio cells may be macro cells (or umbrella cells) which are large cells, usually having a diameter of up to tens of kilometers, or smaller cells such as micro-, femto- or picocells. The (e/g)NodeBs of FIG. 1 may provide any kind of these cells. A cellular radio system may be implemented as a multilayer network including several kinds of cells. Typically, in multilayer networks, one access node provides one kind of a cell or cells, and thus a plurality of (e/g)NodeBs are required to provide such a network structure.

For fulfilling the need for improving the deployment and performance of communication systems, the concept of "plug-and-play" (e/g)NodeBs has been introduced. Typically, a network which is able to use "plug-and-play" (e/g)Node Bs, includes, in addition to Home (e/g)NodeBs (H(e/g)nodeBs), a home node B gateway, or HNB-GW (not shown in FIG. 1). A HNB Gateway (HNB-GW), which is typically installed within an operator's network may aggregate traffic from a large number of HNBs back to a core network.

6G networks are expected to adopt flexible decentralized and/or distributed computing systems and architecture and ubiquitous computing, with local spectrum licensing, spectrum sharing, infrastructure sharing, and intelligent automated management underpinned by mobile edge computing, artificial intelligence, short-packet communication and blockchain technologies. Key features of 6G will include intelligent connected management and control functions, programmability, integrated sensing and communication, reduction of energy footprint, trustworthy infrastructure, scalability and affordability. In addition to these, 6G is also targeting new use cases covering the integration of localization and sensing capabilities into system definition to unifying user experience across physical and digital worlds.

In wireless communications networks the operation of the system is constantly monitored by the operator of the network so that possible problems in the performance of the system may be detected and operation evaluated. As mentioned, typically collected data is denoted Key Performance Indicators, KPIs.

In wireless networks, measurement reporting is important to enable many procedures such as scheduling and handover. Lately Machine Learning, ML, has been introduced to enhance the operation of the networks. With the integration of ML based functionalities in the network, measurement reporting is also crucial to monitor the performance of the deployed ML and realize the related operations accordingly, such as ML model update or switch to another model or fall back to non-ML operation.

Usually, the collection and reporting of the KPIs is realized at an aggregated level. For example, the data may be collected and reported averaged on a predefined time window or averaged over several UEs/cells. This aggregation is beneficial to facilitate the processing and analysis of the collected information which otherwise would be huge, given of the traffic volume and the number of served UEs in the network.

However, in some cases where performance of the network is degrading, for example when ML is utilised, it is necessary to obtain more information on the operation of the network, dive more into the reported measurements and have more in-depth analysis to have better understanding of the situation and figure out the possible solutions.

Embodiments of the present invention enable adaptive KPI collection in the network. For example, KPI for ML based functionalities of the network may be adaptively collected. Some embodiments relate to procedures and associated signaling enhancements to enable adaptive KPI collection in wireless access networks.

Figure 2:
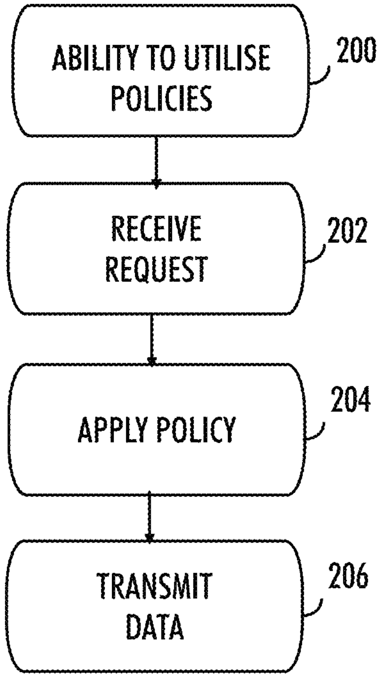
FIGS. 2 and 3 are flowcharts illustrating some embodiments.

The flowchart of FIG. 2 illustrates an embodiment. The flowchart illustrates an example of an embodiment applied in an apparatus such as a network element. The apparatus may be a network element or node communicating with terminal devices such as an (e/g)NodeB of a communication system, for example. The apparatus may be a part of an (e/g)NodeB. The apparatus may be located at the (e/g) NodeB or in cloud server connected to the (e/g)NodeB, for example.

In step 200, the apparatus is configured to maintain ability to collect network performance data utilizing a collecting policy from more than one collecting policy. The network performance data may be KPIs of the network. The performance data, which is monitored, may be average UE throughput or average cell spectral efficiency, for example.

In an embodiment, the network performance data collecting policy comprises time granularity of data collecting and/or type of data to collect.

In step 202, the apparatus is configured to receive from a network element a request to apply a given collecting policy. The network element may be a network element responsible for Operation And Maintenance, OAM, or Network Data Analytics Function, NWDAF, or the Management Data Analytics Function, MDAF, in the network, for example.

In an embodiment, the request to apply a given policy comprises a time duration the policy is to be applied.

In step 204, the apparatus is configured to apply the requested collecting policy in collecting network performance data.

In step 206, the apparatus is configured to transmit network performance data to the network based on the applied policy. In an embodiment, not only the collecting of the KPIs (what to collect and when), but also the transmission (e.g. when and how to transmit, such as periodicity) of the network performance data is defined by the applied KPI collecting policy. However, in another embodiment, the applied KPI collecting policy defines the collecting of the KPIs while the transmission of the network performance data is possibly the same for all policies.

Figure 3:
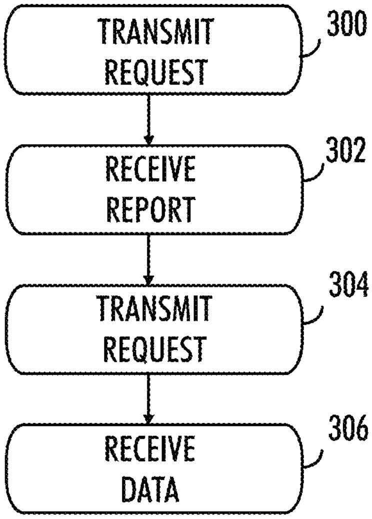

The flowchart of FIG. 3 illustrates an embodiment. The flowchart illustrates an example of an embodiment applied in an apparatus such as a network element. The apparatus may be a network element communicating with (e/g) NodeBs of a communication network, for example. The network element may be a network element responsible for Operation And Maintenance, OAM, or Network Data Analytics Function, NWDAF, in the network, for example.

In step 300, the apparatus is configured to transmit to a network node (such as to a nodeB) a request to report the network performance data collecting policies supported by the network node.

In step 302, the apparatus is configured to receive from the network node a report of the policies supported by the network node.

In step 304, the apparatus is configured to transmit to the network node a request to apply a given collecting policy supported by the network node. In an embodiment, the request to apply a given policy comprises the time duration the policy is to be applied.

In step 306, the apparatus is configured to receive from the network node network performance data based on the applied policy.

Thus, in the network there may be different network performance data or KPI collection policies, including configurations of KPI collection. The configurations may comprise time granularity information and/or type of KPI to collect.

The policies may include different configurations for KPI collecting.

A default monitoring policy for continual verification of the functioning: KPIs aggregated and reported at high level time granularity, such as each 1h, for example.

An 'In depth' monitoring policy may comprise fine time granularity, e.g. each 15 min. In an embodiment, applying the In-depth monitoring option may be based on different criteria.

For example, a gNB as an example of the network node might be instructed not to apply In-depth monitoring if it experiences high load. In an embodiment, the request to apply a given collecting policy comprises an indication for the gNB not to apply the policy or return to previous policy if the load experienced by the gNB is above a given threshold.

The In-depth monitoring option depends on the capabilities of the gNB for KPI/measurement collection.

The request to apply a given policy may comprise a time window or a triggering condition to fall back to a previously used monitoring option, to the default monitoring option or to switch to the in-depth monitoring. It is noted that although the KPI collecting entity (e.g. the OAM) may request to apply a certain policy, the gNB may also or alternatively adjust the policy based on the internal state of the gNB.

In an embodiment, a network element or entity, such as core network such as NWDAF and OAM such as MDAF, may be in charge of setting the different configurations and realizing the advanced analysis using the enhanced KPI reports.

Figure 4:
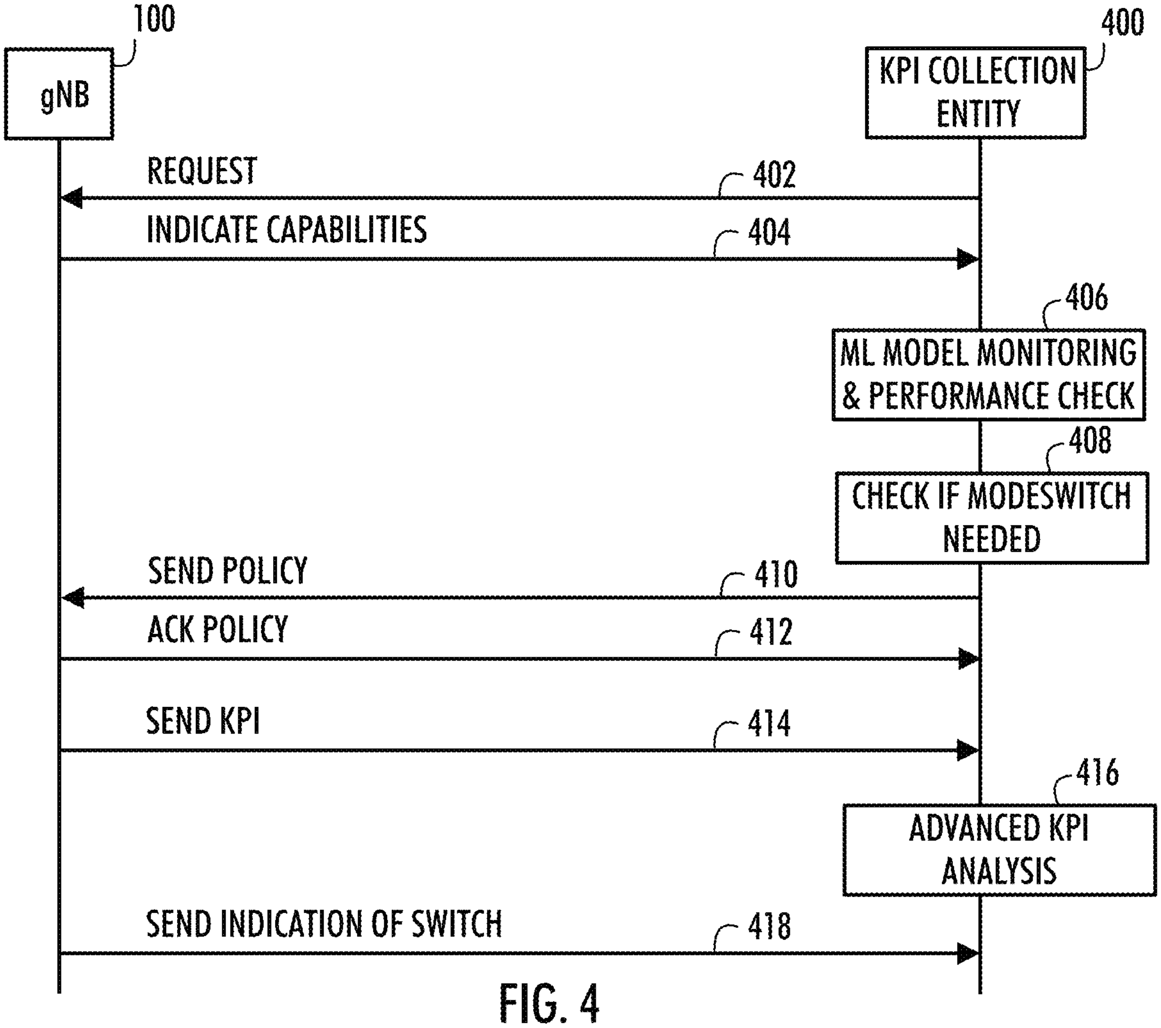
FIGS. 4, 5 and 6 are signalling charts illustrating some embodiments.

FIG. 4 illustrates an embodiment of signaling in connection with adaptive KPI collecting. As mentioned, collection policy switch may be triggered from the network, for example by a network element responsible by OAM or NWDAF. FIG. 4 illustrates a general signaling example and depicts the signaling between a network element 400 responsible for KPICollectionEntity and gNB 100 (as an example of the network node of FIG. 2) to enable advanced KPI collection and monitoring.

The network element 400 transmits a request 402 to the gNB 100 to report KPI collection capabilities from gNB. These capabilities could relate to KPI type (e.g. which KPIs the gNB can monitor), KPI collection granularity (e.g. how frequently the KPI can be monitored), duration (e.g. how long the KPIs can be monitors), raw measurements (e.g. which measurements the gNB 100 can perform in order to collect the KPI(s)), for example.

The gNB 100 transmits a response 404 to the request. The response may be an indication of the KPI collection capabilities of the gNB.

The network element 400 may then perform 406 model monitoring and performance checking. This may comprise monitoring the performance of ML algorithm executed in the network.

The network element 400 may then check 408 which KPI policy, among the plurality of KPI collecting policies supported by the gNB, should be used for collecting the KPIs, and in step 410 send a request to apply the policy.

Alternatively, if the gNB 100 already uses a KPI collecting policy, the network element 400 may then check 408 if the KPI collecting policy needs to be switched to another policy supported by the gNB. In an embodiment, the criteria for switching the policy may be time dependent or dependent on the load of the gNB.

For example, if there is a need to quickly obtain data to resolve if there is a performance degradation in the network, then monitoring mode may be switched to 'in-depth mode' to continuously gather the KPIs or change the time intervals to speed up the gathering of KPIs.

For example, if the current collection policy is the default policy with data collecting at 15 min intervals, for example, and a performance degradation is detected, then switch to an in-depth policy may be required to gather data to determine what action to take. For example, an action could be to switch to a non-ML operation or to perform a retraining of ML algorithm.

If the collecting policy needs to be switched, the network element 400 may then transmit a request to switch the policy in step 410. In an embodiment, the request comprises attributes related to the switch. The attributes may be KPI monitoring mode (Normal, In-Depth, Relaxed), periodicity (coarse, continuous, intermittent) and gNBInternalState (LoadHigh, LoadLow), for example.

The KPI monitoring mode and periodicity may be linked together. If monitoring mode is "Normal", the periodicity could be coarse like once in 15 min or in 1 hour. If monitoring mode is "Relaxed", the periodicity can be intermittent for a given range, for example 5 min in an hour, if the range is between 8 am and 8 μm, for example. If monitoring mode is "In-Depth", the periodicity could be continuous at a more granular level, intermittent for a given range, for example once in 1 min or 30 secs.

In an embodiment, as part of the request, an indication of a load factor of the gNB 100 may also be a parameter to account for the selection of the KPI monitoring mode. This parameter could be part of the policy. For example, if gNB has a high load, the indicated in-depth collection mode could be discarded or the period when it is applied can be shortened. Thus, a gNB 100 experiencing a high load may choose to accept or discard the proposed configuration change.

The gNB acknowledges 412 to the network element the request.

Next, the gNB transmits 414 data according to the requested mode with given periodicity.

The network element 400 may perform 416 KPI analysis based on the received data. This will be explained later below.

When the requested duration has elapsed the gNB may switch to normal or default collecting policy and inform 418 this the network element.

Figure 5:
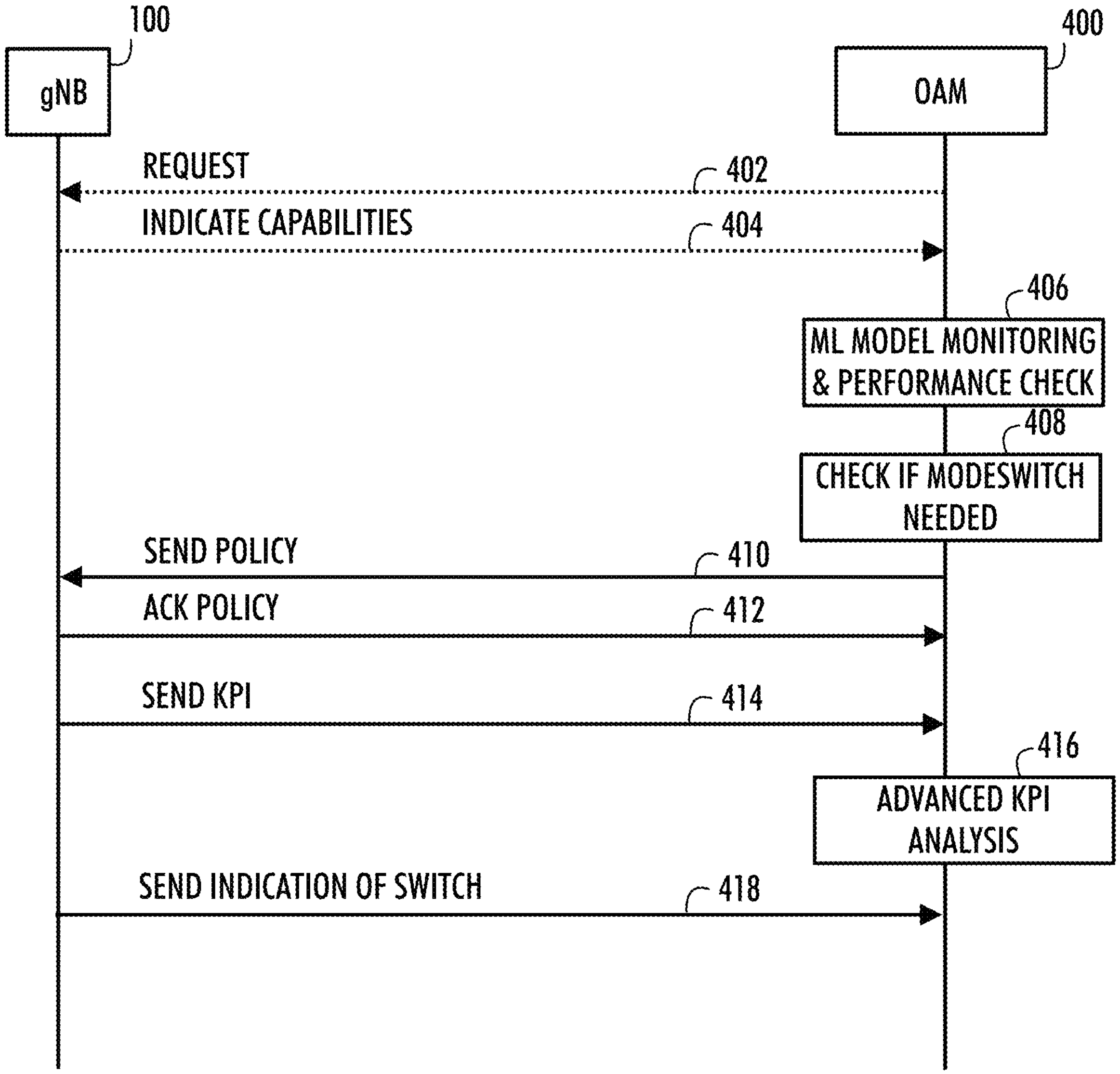

FIG. 5 illustrates an embodiment of signaling in connection with adaptive KPI collecting where the network element 400 is the network element responsible for Operation And Maintenance, OAM.

In this example, the steps 402 and 404 are optional as the OAM is already aware of gNB characteristics. Otherwise, the steps follow the steps of FIG. 4.

Figure 6:
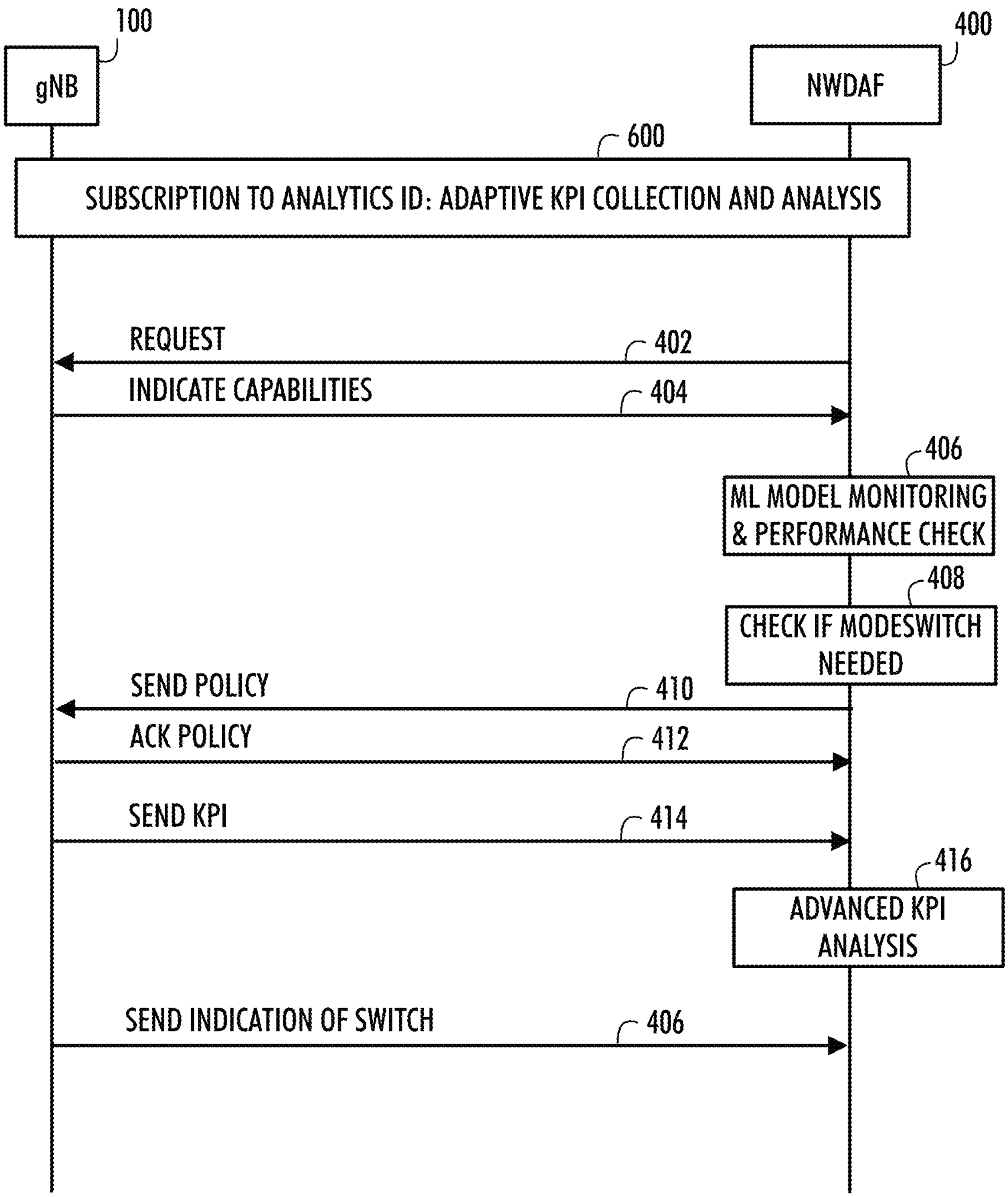

FIG. 6 illustrates an embodiment of signaling in connection with adaptive KPI collecting where the network element 400 is the network element responsible for Network Data Analytics Function, NWDAF.

In this example, KPI Collection policy is triggered from the network element handling NWDAF, which is a Core Network element that interacts with the NG-RAN via a subscription mechanism.

The NWDAF subscribes 600 to the gNB to receive KPI Collection abilities. Otherwise, the steps follow the steps of FIG. 4.

Figure 7:
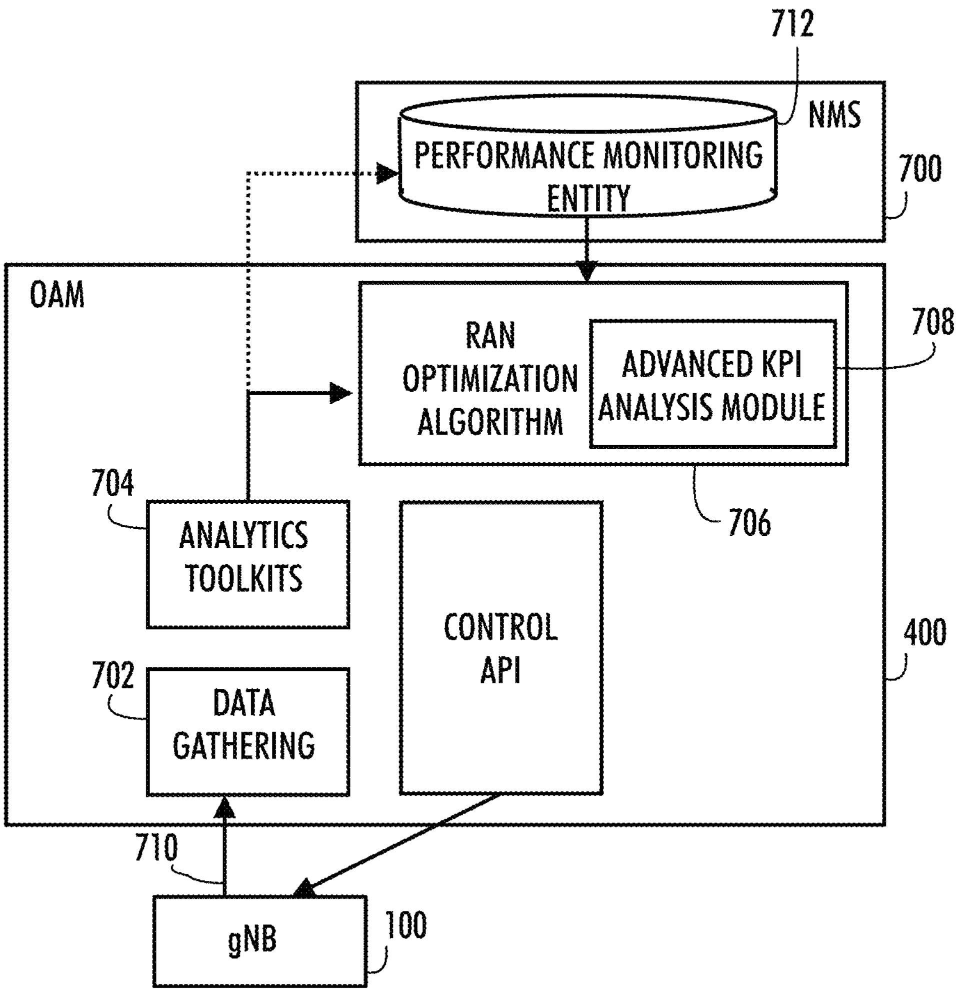
FIG. 7 illustrates an example of operation in an embodiment.

FIG. 7 illustrates the operation in model monitoring and performance checking step 406. It illustrates the network node, such as the gNB 100, the network element 400 responsible for OAM, and Network Management System NMS 700.

In an embodiment, in this step statistical distance calculation is performed on the gathered KPI.

The gNB 100 is configured to gather KPIs per KPI collection policy used and this data is sent 710 to the Data gathering module 702 where it is segregated based on whether the ML Algorithm (e.g. the KPI collecting policy) is enabled or disabled.

The Analytics toolkit 704 is a platform provided for Data Science and Machine Learning. RAN Optimization Algorithms component 706 uses the Analytics Toolkit and the KPI Data collected and segregated. Advanced KPI Analysis 708 is triggered periodically by the Performance Monitoring Entity 712 in the NMS 700. Advanced KPI Analysis 708 may be part of the RAN Algorithms Component 706. In an embodiment, the block 708 utilizes blocks 704 and 702. In an embodiment, the advanced KPI analysis may be triggered by the block 700.

Figure 8:
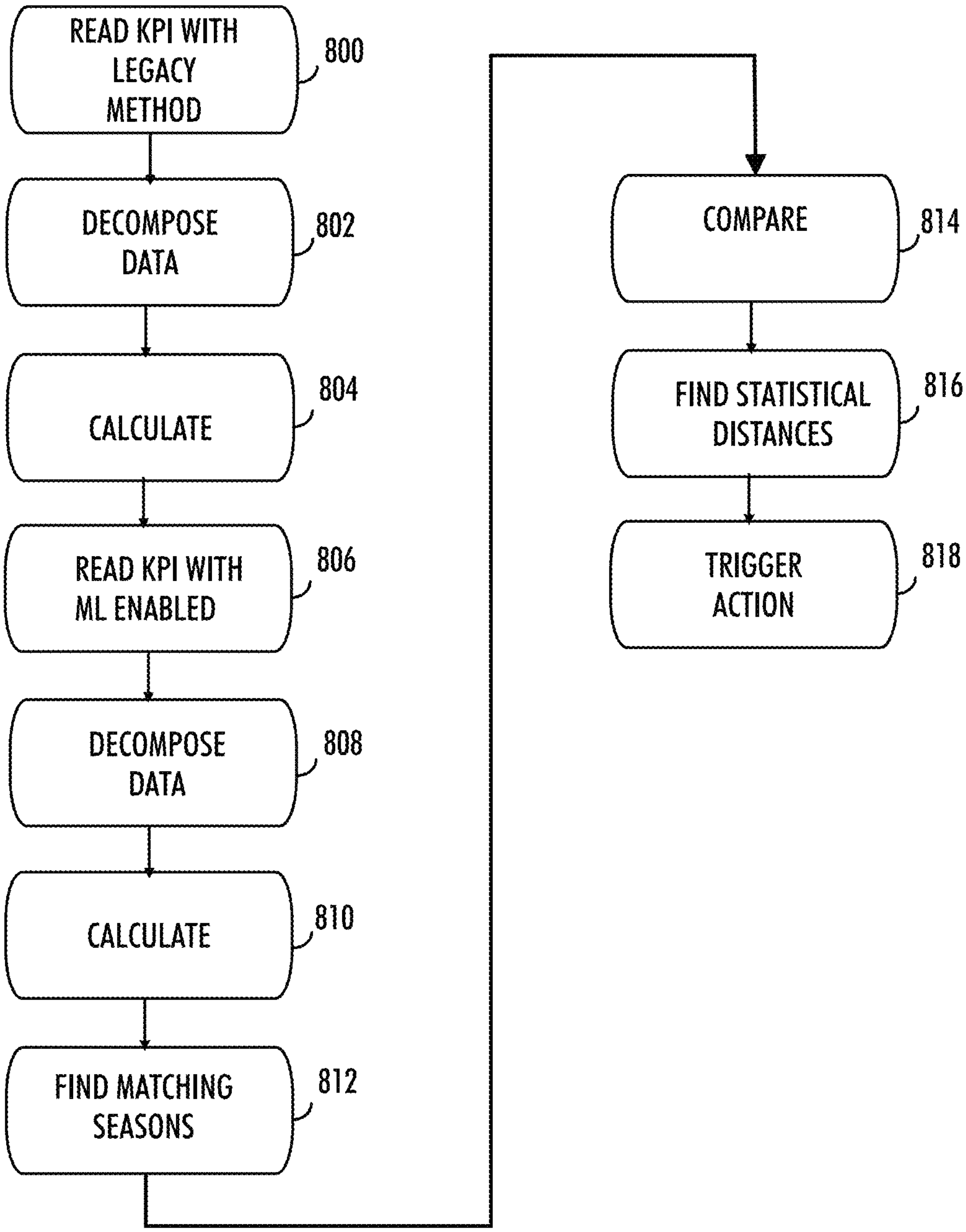
FIG. 8 is a flowchart illustrating an embodiment.

FIG. 8 illustrates an example of the operation in Advanced KPI Analysis step 416 when statistical distance calculation is performed.

In an embodiment, statistical distance calculation is used on the gathered KPI data to determine whether there is any change in the KPIs when machine learning functionalities are enabled and when machine learning functionalities are disabled.

There are multiple ways to calculate the statistical distance between two distributions. For example, Hellinger distance is one of the methods known in the art. This distance type is specified per use case as a part of policy.

As part of the Hellinger distance determination, the change in KPIs may be determined by comparing moments associated with KPIs. Here term “moments” may be defined as a mean, deviation or a change in the KPIs or in the KPI distribution when machine learning algorithm is disabled vs enabled, possibly specified per use case as a part of policy. A “season”, on the other hand, may be defined by the environment (UE distribution, load, mobility etc). These seasons may be repetitive trends. How to detect these seasons is not in the scope of this document.

KPIs are continuously gathered for repetitive seasons: In one season machine learning functionalities are disabled and, in another season the machine learning functionalities are enabled.

Thus, in step 800, KPI collected with machine learning functionalities disabled is read.

In step 802, data is decomposed into season, trends residual along with their time range.

In step 804, moments are calculated for each season.

In step 806, KPI collected with machine learning functionalities enabled is read.

In step 808, data is decomposed into season, trends residual along with their time range.

In step 810, moments are calculated for each season.

In step 812 the matching (time range) seasons from data obtained with machine learning functionalities disabled are searched for. A non-limiting example: the performance of the machine learning model is measured between 2-3 PM on a given day (enabling machine learning) and the same the next day again between 2-3 PM disabling the machine learning functionality.

In step 814, the found seasons are compared.

In step 816, statistical distances between the seasons are searched for. For example, to calculate statistical distance the moments (e.g. mean, median) in the matching seasons may be utilized.

In step 818, if the differences in the moments and statistical distance exceed given thresholds, a corresponding action may be triggered. The action may be, for example, trigger training machine learning algorithm, returning to operation with machine learning functionalities disabled, or continue in current state.

Thus, for example, if statistical distance between KPI distributions is used to analyze the performance for repetitive seasons, the moments (mean, median) are gathered in the same/matching seasons and these moments between KPI distributions are compared when machine learning functionalities enabled and machine learning functionalities disabled, and the statistical distance between KPI distributions in the similar season is calculated. If the difference in moments and statistical distance crosses a given specified threshold value, which may depend on the use case, a corresponding action is triggered which could be either to launch a retraining or fall back to legacy, for example.

Figure 9A:
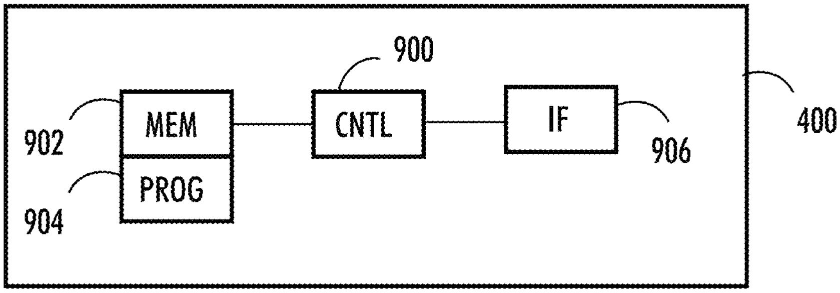
FIGS. 9A, 9B and 9C illustrate apparatuses according to some embodiments.

FIG. 9A illustrates an embodiment. The figure illustrates a simplified example of an apparatus 400 applying embodiments of the disclosure. In some embodiments, the apparatus may be a network element. The network element may be a network element responsible for Operation And Maintenance, OAM, or Network Data Analytics Function, NWDAF, or the Management Data Analytics Function, MDAF, in the network, for example.

It should be understood that the apparatus is depicted herein as an example illustrating some embodiments. It is apparent to a person skilled in the art that the network element apparatus may also comprise other functions and/or structures and not all described functions and structures are required. Although the apparatus has been depicted as one entity, different modules and memory may be implemented in one or more physical or logical entities.

The apparatus 400 of the example includes a control circuitry 900 configured to control at least part of the operation of the apparatus.

The apparatus may comprise a memory 902 for storing data. Furthermore, the memory may store software 904 executable by the control circuitry 900. The memory may be integrated in the control circuitry.

The apparatus may comprise one or more interface circuitries 906. The interface circuitries are operationally connected to the control circuitry 900. The one or more interface circuitries 906 may connect the apparatus to other network elements in a wired or wireless manner, for example to an (e/g)NodeBs of the communication system In an embodiment, the software 904 may comprise a computer program comprising program code means configured to cause the control circuitry 900 of the apparatus to realize at least some of the embodiments described above.

Figure 9B:
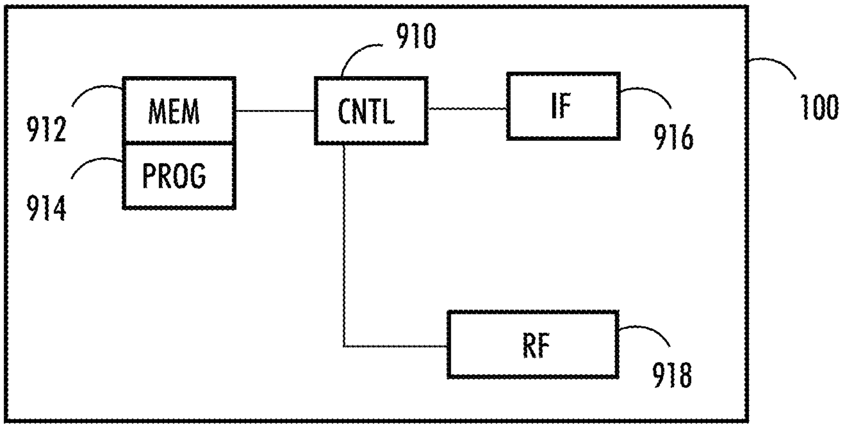

FIG. 9B illustrates an embodiment. The figure illustrates a simplified example of a network element/node applying embodiments of the disclosure. In some embodiments, the network element/node may be an (e/g)NodeB, or a part of a (e/g)NodeB of a communication system.

It should be understood that the network element is depicted herein as an example illustrating some embodiments. It is apparent to a person skilled in the art that the network element may also comprise other functions and/or structures and not all described functions and structures are required. Although the network element has been depicted as one entity, different modules and memory may be implemented in one or more physical or logical entities.

The network element 100 of the example includes a control circuitry 910 configured to control at least part of the operation of the network element.

The network element may comprise a memory 912 for storing data. Furthermore, the memory may store software 914 executable by the control circuitry 910. The memory may be integrated in the control circuitry.

The network element may comprise one or more interface circuitries 916, 918. The interface circuitries are operationally connected to the control circuitry 910. An interface circuitry 916 may be a set of transceivers configured to communicate with UEs of a wireless communication network. The interface circuitry may be connected to an antenna arrangement (not shown). The network element may also comprise a connection to a transmitter instead of a transceiver.

An interface circuitry 918 may connect the apparatus to other network elements in a wired or wireless manner, for example to network elements of the communication system. The network elements may be network elements responsible for OAM, NWDAF or MDAF in the system, for example.

In an embodiment, the software 914 may comprise a computer program comprising program code means configured to cause the control circuitry 910 of the network element to realize at least some of the embodiments described above.

Figure 9C:
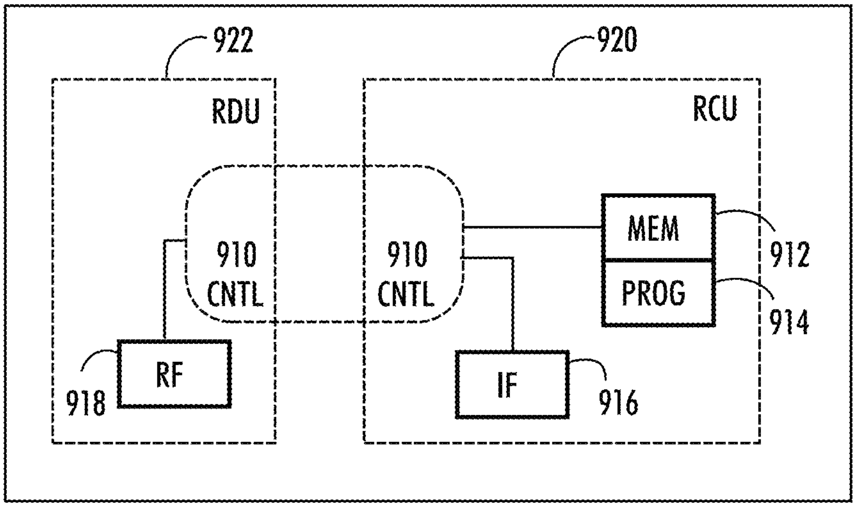

In an embodiment, as shown in FIG. 9C, at least some of the functionalities of the apparatus of FIG. 9B may be shared between two physically separate devices, forming one operational entity. Therefore, the apparatus may be seen to depict the operational entity comprising one or more physically separate devices for executing at least some of the described processes. Thus, the apparatus of FIG. 9C, utilizing such shared architecture, may comprise a remote control unit RCU 920, such as a host computer or a server computer, operatively coupled (e.g. via a wireless or wired network) to a remote distributed unit RDU 922 located in the base station. In an embodiment, at least some of the described processes may be performed by the RCU 920. In an embodiment, the execution of at least some of the described processes may be shared among the RDU 922 and the RCU 920.

In an embodiment, the RCU 920 may generate a virtual network through which the RCU 920 communicates with the RDU 922. In general, virtual networking may involve a process of combining hardware and software network resources and network functionality into a single, software-based administrative entity, a virtual network. Network virtualization may involve platform virtualization, often combined with resource virtualization. Network virtualization may be categorized as external virtual networking which combines many networks, or parts of networks, into the server computer or the host computer (e.g. to the RCU). External network virtualization is targeted to optimized network sharing. Another category is internal virtual networking which provides network-like functionality to the software containers on a single system. Virtual networking may also be used for testing the terminal device.

In an embodiment, the virtual network may provide flexible distribution of operations between the RDU and the RCU. In practice, any digital signal processing task may be performed in either the RDU or the RCU and the boundary where the responsibility is shifted between the RDU and the RCU may be selected according to implementation.

The steps and related functions described in the above and attached figures are in no absolute chronological order, and some of the steps may be performed simultaneously or in an order differing from the given one. Other functions can also be executed between the steps or within the steps. Some of the steps can also be left out or replaced with a corresponding step.

The apparatuses or controllers able to perform the above-described steps may be implemented as an electronic digital computer, processing system or a circuitry which may comprise a working memory (random access memory, RAM), a central processing unit (CPU), and a system clock. The CPU may comprise a set of registers, an arithmetic logic unit, and a controller. The processing system, controller or the circuitry is controlled by a sequence of program instructions transferred to the CPU from the RAM. The controller may contain a number of microinstructions for basic operations. The implementation of microinstructions may vary depending on the CPU design. The program instructions may be coded by a programming language, which may be a high-level programming language, such as C, Java, etc., or a low-level programming language, such as a machine language, or an assembler. The electronic digital computer may also have an operating system, which may provide system services to a computer program written with the program instructions.

As used in this application, the term 'circuitry' refers to all of the following: (a) hardware-only circuit implementations, such as implementations in only analog and/or digital circuitry, and (b) combinations of circuits and software (and/or firmware), such as (as applicable): (i) a combination of processor(s) or (ii) portions of processor(s)/software including digital signal processor(s), software, and memory(ies) that work together to cause an apparatus to perform various functions, and (c) circuits, such as a microprocessor(s) or a portion of a microprocessor(s), that require software or firmware for operation, even if the software or firmware is not physically present.

This definition of 'circuitry' applies to all uses of this term in this application. As a further example, as used in this application, the term 'circuitry' would also cover an implementation of merely a processor (or multiple processors) or a portion of a processor and its (or their) accompanying software and/or firmware. The term 'circuitry' would also cover, for example and if applicable to the particular element, a baseband integrated circuit or applications processor integrated circuit for a mobile phone or a similar integrated circuit in a server, a cellular network device, or another network device.

Embodiments as described may also be carried out in the form of a computer process defined by a computer program or portions thereof. Embodiments of the methods described in connection with FIGS. 1 to 8 may be carried out by executing at least one portion of a computer program comprising corresponding instructions. The computer program may be provided as a computer readable medium comprising program instructions stored thereon or as a non-transitory computer readable medium comprising program instructions stored thereon. The computer program may be in source code form, object code form, or in some intermediate form, and it may be stored in some sort of carrier, which may be any entity or device capable of carrying the program. For example, the computer program may be stored on a computer program distribution medium readable by a computer or a processor. The computer program medium may be, for example but not limited to, a record medium, computer memory, read-only memory, electrical carrier signal, telecommunications signal, and software distribution package, for example. The computer program medium may be a non-transitory medium. Coding of software for carrying out the embodiments as shown and described is well within the scope of a person of ordinary skill in the art.

Even though the embodiments have been described above with reference to examples according to the accompanying drawings, it is clear that the embodiments are not restricted thereto but can be modified in several ways within the scope of the appended claims. Therefore, all words and expressions should be interpreted broadly and they are intended to illustrate, not to restrict, the embodiment. It will be obvious to a person skilled in the art that, as technology advances, the inventive concept can be implemented in various ways. Further, it is clear to a person skilled in the art that the described embodiments may, but are not required to, be combined with other embodiments in various ways.

The invention claimed is:

1. An apparatus comprising:

at least one processor; and at least one memory including computer program code;

the at least one memory storing instructions that, when executed by the at least one processor, cause the apparatus at least to:

maintain ability to collect network performance data utilizing a collecting policy from more than one collecting policy;

transmit, from the apparatus to a network node, a request to report capabilities of the network performance data collection supported by the network node;

receive the supported capabilities from the network node, the supported capabilities comprising a plurality of key performance indicator (KPI) policies, including which KPI types the apparatus can monitor, how frequently KPIs can be monitored, how long KPIs can be monitored, which measurements the apparatus can perform in order to collect the KPIs;

determine, by the apparatus, which KPI policy, among the plurality of KPI collecting policies supported by the network node, to use for collecting the KPIs;

receive, from the apparatus, a request to apply the KPI policy;

cause the requested KPI policy to be applied for collecting network performance data;

obtain a first set of network performance data based on the applied KPI policy applied during a first period of time;

obtain a second set of network performance data based on the applied KPI policy being disabled during a second period of time;

compare the first set of network performance data with the second set of network performance data;

based on the comparing, determine that a difference between the first set of network performance data and the second set of network performance data exceeds a threshold; and based on exceeding the threshold, disable the applied KPI policy and perform a retraining of the applied KPI policy.

2. The apparatus of claim 1, wherein the instructions, when executed by the at least one processor, cause the apparatus further to:

determine that a current KPI policy is a default policy with a relaxed monitoring mode;

determine that a performance degradation is detected; and based on the performance degradation, switch the current KPI policy to a KPI policy that has an in-depth monitoring mode to gather data to determine what action to take.

3. The apparatus of claim 2, wherein a KPI policy defines time granularity of data collecting for the network performance data.

4. The apparatus of claim 3, wherein the KPI policy further defines a type of data to collect for the network performance data.

5. The apparatus of claim 4, wherein the request to apply the KPI policy defines a time duration the KPI policy is to be applied.

6. The apparatus of claim 5, wherein the instructions, when executed by the at least one processor, cause the apparatus further to:

switch to a default network performance data collecting policy when the time duration of the KPI policy requested by the apparatus has elapsed.

7. The apparatus of claim 6, wherein the instructions, when executed by the at least one processor, cause the apparatus further to:

receive, by the apparatus, information that the KPI policy was switched.

8. The apparatus of 7, wherein the request to apply the KPI policy comprises an indication for the apparatus to return to previous KPI policy.

9. A system comprising:

an apparatus:

at least one processor; and at least one memory including computer program code;

the at least one memory storing instructions that, when executed by the at least one processor, cause the apparatus at least to:

maintain ability to collect network performance data utilizing a collecting policy from more than one collecting policy;

transmit, from the apparatus to a network node, a request to report capabilities of the network performance data collection supported by the network node;

receive the supported capabilities from the network node, the supported capabilities comprising a plurality of key performance indicator (KPI) policies, including which KPI types the apparatus can monitor, how frequently KPIs can be monitored, how long KPIs can be monitored, which measurements the apparatus can perform in order to collect the KPIs;

determine, by the apparatus, which KPI policy, among the plurality of KPI collecting policies supported by the network node, to use for collecting the KPIs;

receive, from the apparatus, a request to apply the KPI policy;

cause the requested KPI policy to be applied for collecting network performance data;

obtain a first set of network performance data based on the applied KPI policy applied during a first period of time;

obtain a second set of network performance data based on the applied KPI policy being disabled during a second period of time;

compare the first set of network performance data with the second set of network performance data;

based on the comparing, determine that a difference between the first set of network performance data and the second set of network performance data exceeds a threshold; and based on exceeding the threshold, disable the applied KPI policy and perform a retraining of the applied KPI policy.

10. The system of claim 9, wherein the instructions, when executed by the at least one processor, cause the apparatus further to:

determine that a current KPI policy is a default policy with a relaxed monitoring mode;

determine that a performance degradation is detected; and based on the performance degradation, switch the current KPI policy to a KPI policy that has an in-depth monitoring mode to gather data to determine what action to take.

11. The system of claim 10, wherein a KPI policy defines time granularity of data collecting for the network performance data.

12. The system of claim 11, wherein the KPI policy further defines a type of data to collect for the network performance data.

13. The system of claim 12, wherein the request to apply the KPI policy defines a time duration the KPI policy is to be applied.

14. The system of claim 13, wherein the instructions, when executed by the at least one processor, cause the apparatus further to:

switch to a default network performance data collecting policy when the time duration of the KPI policy requested by the apparatus has elapsed.

15. The system of claim 14, wherein the instructions, when executed by the at least one processor, cause the apparatus further to:

receive, by the apparatus, information that the KPI policy was switched.

16. The system of 15, wherein the request to apply the KPI policy comprises an indication for the apparatus to return to previous KPI policy.

17. A method comprising:

maintaining ability to collect network performance data utilizing a collecting policy from more than one collecting policy;

transmitting, from an apparatus to a network node, a request to report capabilities of the network performance data collection supported by the network node;

receiving the supported capabilities from the network node, the supported capabilities comprising a plurality of key performance indicator (KPI) policies, including which KPI types the apparatus can monitor, how frequently KPIs can be monitored, how long KPIs can be monitored, which measurements the apparatus can perform in order to collect the KPIs;

determining, by the apparatus, which KPI policy, among the plurality of KPI collecting policies supported by the network node, to use for collecting the KPIs;

transmitting, from the apparatus, a request to apply the KPI policy;

causing the requested KPI policy to be applied for collecting network performance data;

obtaining a first set of network performance data based on the applied KPI policy applied during a first period of time;

obtaining a second set of network performance data based on the applied KPI policy being disabled during a second period of time;

comparing the first set of network performance data with the second set of network performance data;

based on the comparing, determining that a difference between the first set of network performance data and the second set of network performance data exceeds a threshold; and based on exceeding the threshold, disabling the applied KPI policy and perform a retraining of the applied KPI policy.

18. The method of claim 17, further comprising:

determining that a current KPI policy is a default policy with a relaxed monitoring mode;

determining that a performance degradation is detected; and based on the performance degradation, switching the current KPI policy to a KPI policy that has an in-depth monitoring mode to gather data to determine what action to take.

19. The method of claim 18, wherein a KPI policy defines time granularity of data collecting for the network performance data.

20. The method of claim 19, further comprising:

switching to a default network performance data collecting policy when the time duration of the KPI policy requested by the apparatus has elapsed.

* * * * *